United States Patent [19]

Hirano

[11] Patent Number: 4,792,674
[45] Date of Patent: Dec. 20, 1988

[54] OPTICAL HEAD ASSEMBLY AND ELEMENT HOLDER WITH POSITIONAL ADJUSTMENT

[75] Inventor: Shizuo Hirano, Saitama, Japan
[73] Assignee: Pioneer Electronic Corporation, Tokyo, Japan
[21] Appl. No.: 80,133
[22] Filed: Jul. 31, 1987
[30] Foreign Application Priority Data Jul. 31, 1986 [JP] Japan .................. 61-180967
Jul. 31, 1986 [JP] Japan .................. 61-180968

[51] Int. Cl.⁴ .................................................. G11B 7/00
[52] U.S. Cl. .................................... 250/216; 250/239; 369/112
[58] Field of Search ............ 250/239, 216, 201 DF; 369/43–46, 112; 350/245, 247, 255

[56] References Cited
U.S. PATENT DOCUMENTS

| | | |
|---|---|---|
| 4,498,737 | 2/1985 | Doggett ............................. 369/45 |
| 4,644,516 | 2/1987 | Mush ................................ 250/201 |
| 4,652,095 | 3/1987 | Mauro .............................. 350/247 |
| 4,709,139 | 11/1987 | Nakamura et al. ............... 250/201 |

Primary Examiner—Edward P. Westin
Assistant Examiner—Charles Wieland
Attorney, Agent, or Firm—Sughrue, Mion, Zinn, Macpeak and Seas

[57] ABSTRACT

An optical read/write head assembly for a record disk includes a hollow body member 3, 6 mounting an objective lens 1, a prism 16 and a laser 10. An intermediate plate 20 is mounted to the body by a screw 21 extending through an enlarged bore 23 in the plate to enable its positional adjustment in an X-Y plane. A cylindrical holder 8 extends slidably through a further bore 29 in the plate and through an enlarged bore 36 in the body member, and mounts a quadranted photodiode on its inner end. The holder is axially adjustable in the Z axis direction, to thus enable the centering and focusing of a reflected beam on the face of the photodiode.

6 Claims, 7 Drawing Sheets

OPTICAL HEAD ASSEMBLY AND ELEMENT HOLDER WITH POSITIONAL ADJUSTMENT

BACKGROUND OF THE INVENTION

This invention relates to an optical head assembly for adjustably mounting a read/write laser and a monitoring photodiode(s).

In video disks, digital audio disks and the like, used as media for recording information, an information signal is recorded by forming pits in a spiral track corresponding to the information signal through irradiation of the record surface of the disk with a fine spot of light. When the information signal thus recorded is to be reproduced, the original information signal is reproduced corresponding to the change of reflected or transmitted light by irradiation of the track with a spot of light.

Various types of optical head assemblies for performing such recording and reproduction include a light emitting element such as a semiconductor laser, an objective lens for spot focusing the laser light onto the record surface of the disk, and light receiving elements such as photodiodes for receiving light reflected from the record surface of the disk to generate an output information signal.

FIG. 7 shows a member used in a conventional optical head assembly, in which a semiconductor laser 51 formed as an element in a chip is housed in an airtight package 55 constituted by a cylindrical casing 52, a glass plate 53 and a cover 54, and is connected to terminals 56 by wiring (not shown). The member, together with other optical members, is attached to a body 57 as shown in FIG. 8. FIG. 9 shows another member used in the conventional optical head assembly, in which photodiodes 59 and 60 formed in a chip are sealed within a package 61 formed by molding resin, and are connected to terminals 62 by wiring (not shown). This member is also attached to the body 57 as shown in FIG. 8. The relative positions of the semiconductor laser and photodiodes are adjusted with high accuracy so that the light reflected from the record surface of the disk 64 after emission from the laser 51 can enter the photodiodes 59 and 60 exactly.

The relative positional adjustment is carried out in three orthogonal directions, i.e. the direction of the path of incident and reflected light, and directions perpendicular to such path and to each other.

For the purpose of the positional adjustment, the packages 55 and 61 supporting the laser 51 and photodiodes 59 and 60 are attached to the body 57 through intermediate positioning members (not shown) provided with guide grooves formed in each adjustment direction. The grooves are slidably fitted to guide projections formed on the body 57 to enable the movement of the intermediate members in any one or more of the aforementioned three directions. Each of the intermediate members is guided by the grooves exactly in the three axial directions, so that each of the packages 55 and 61 is guided exactly. As a result, the adjustment of the relative positions of the semiconductor laser 51 and photodiodes 59 and 60 mounted in their respective packages can be carried out with a high degree of accuracy.

The laser 51 and the photodiodes 59 and 60 in themselves are very small parts, but the packages 55 and 61 surrounding them and the intermediate members are relatively large. Further, the packages and the intermediate members are disposed at predetermined intervals on the body 57. Accordingly, the body 57 supporting the packages and the intermediate members also becomes a large member. This causes difficulties in miniaturizing the optical head assembly.

Further, to adjust the relative positions of the laser and the photodiodes conventionally, a large number of intermediate positioning members must be interposed between the packages and the body. Accordingly, the number of parts increases to make it difficult to reduce the optical head assembly in size and cost as a whole.

SUMMARY OF THE INVENTION

In order to avoid these problems according to an aspect of the present invention, the optical head assembly comprises a pair of holders respectively mounting a light-emitting element and a light-receiving element formed in chips and requiring a relative positional adjustment therebetween, the holders being formed and associated with each other such that the relative positions of the light-emitting element and the light-receiving element can be adjusted in the X, Y and Z directions.

According to another aspect of the present invention, the holder mounting the light-receiving element comprises terminals connected to its electrodes, and a cylindrical holder body having terminal insertion holes through which the terminals are inserted and a guide groove slidably cooperable with an external member so that the holder body is axially guided to implement its position adjustment.

DETAILED DESCRIPTION OF THE PREFERRED EMBODIMENTS

Figure 1:
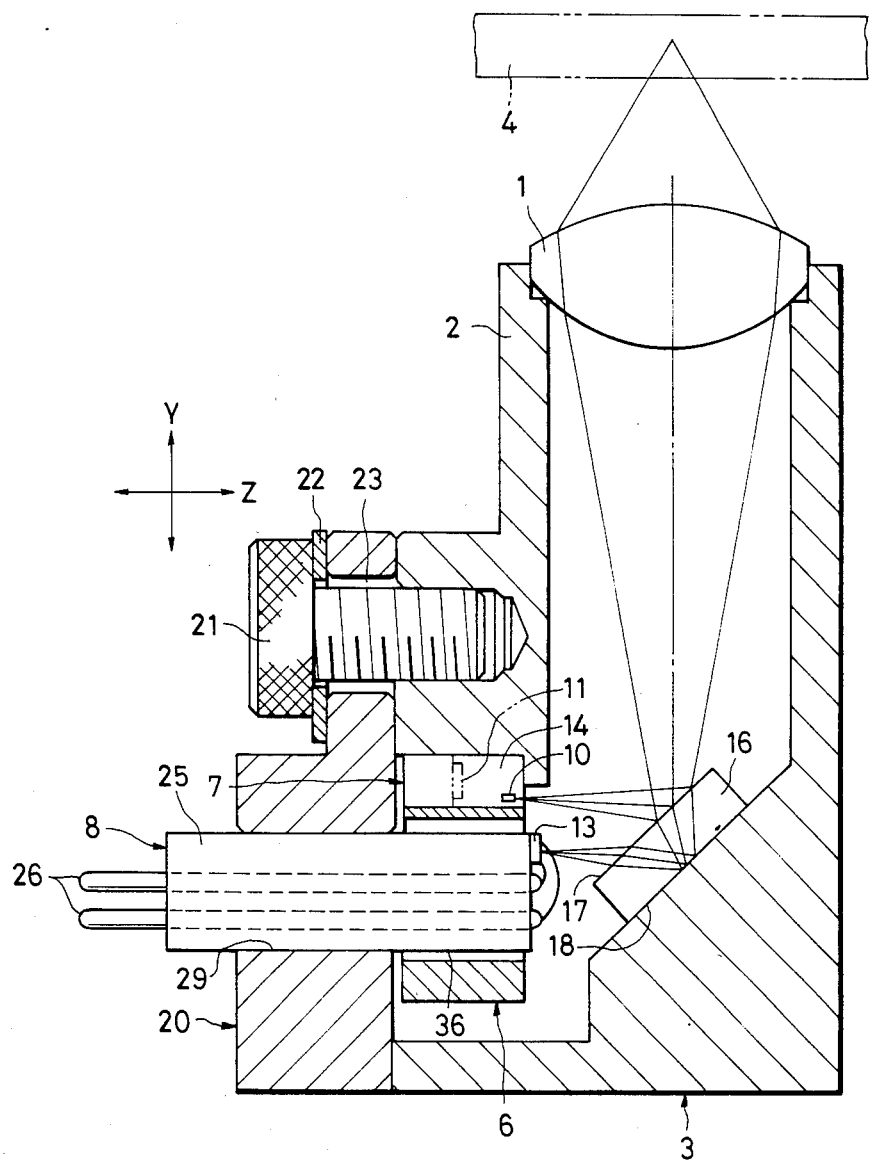
FIG. 1 is a longitudinal sectional view of an optical head assembly according to the present invention.
Figure 2:
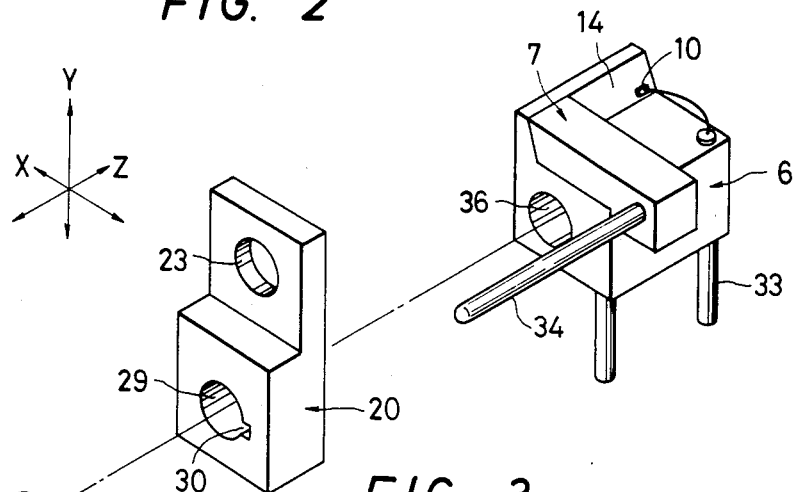
FIGS. 2, 3 and 4 are partly enlarged exploded perspective views of portions of the optical head assembly.
Figure 3:
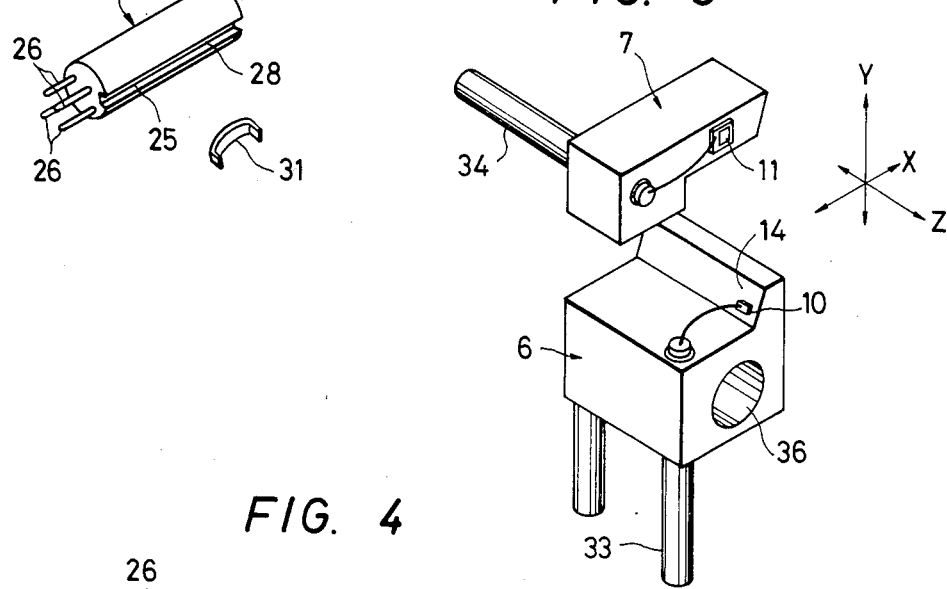
Figure 4:
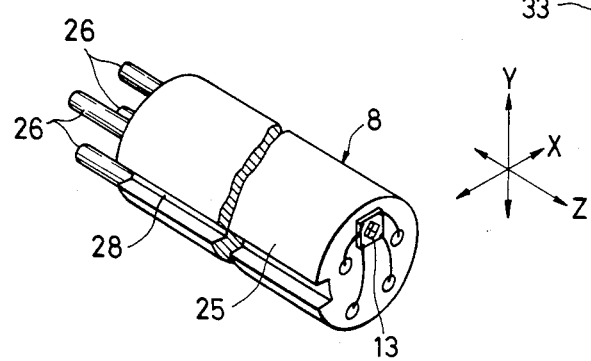

With reference to FIGS. 1 to 4, an optical head assembly of the invention has a lens holder 3 for holding an objective lens 1 at the top end of a cylindrical portion 2 thereof. The lens 1 focuses light emitted from a semiconductor laser (which will be described later in detail) onto a record surface of a disk 4. Three other holders 6, 7 and 8 are attached to the lens holder 3. As shown in FIGS. 2 and 3, a semiconductor laser 10 acting as a light-emitting element is attached to the holder 6, and a monitor photodiode 11 acting as a light-receiving element is fixed to the holder 7. A quartering photodiode 13 acting as a light-receiving element is attached to the holder 8, as shown in FIGS. 1 and 4. As seen in FIGS. 2 and 3, the laser 10 is mounted on a surface 14 formed on the holder 6 inclined at 45 degrees relative to the output optical path. Each of the laser 10, the monitor photodiode 11 and the quartering photodiode 13 is formed in a chip. The quartering photodiode 13 lastly receives light reflected from the record surface of the disk 4 to generate a signal corresponding to the condition of light reception. The monitor photodiode 11 detects a change in the output of the laser, especially due to temperature, to implement a feedback control of the output.

As shown in FIG. 1, a rectangular prism 16 is disposed in the vicinity of the quartering photodiode 13 and fixed to the inner wall of the lens holder 3.

Light emitted from the laser 10 is reflected by a semitransparent mirror plane 17 of the prism 16 and focused by the lens 1 to form a light spot incident on the record surface of the disk 4. Light reflected from the surface of the disk is converged by the lens 1, passed through the mirror plane 17 of the prism and reflected by a rear reflection plane 18. The prism is arranged so that its incident plane (semitransparent mirror plane 17) is inclined to the axis of the reflected light. Accordingly, the prism imparts astigmatism to the light passed through the mirror plane. The reflected, astigmatized light impinges upon the quartering photodiode 13. Due to the astigmatism effect, the shape of the reflected light imaged on the surface of the quartering photodiode changes in accordance with the positioned relation between the surface of the disk 4 and the convergent bundle of light incident thereon. In order to detect the shape of the reflected light, the quartering photodiode 13 is divided into four quadrants by two perpendicularly intersecting lines. The center of the photodiode, at the intersection of the four independent quadrants, is located at the point whereat the reflected light is circularly shaped when focused (focus error is zero). The difference between two values calculated by adding the outputs of opposite quadrants with respect to the center of the photodiode 13 is outputted as a focusing error signal. In accordance with such signal the body of the optical head assembly as shown in FIG. 1 is servo-driven in the axial direction of the lens 1 and in a direction perpendicular thereto.

An arrangement for adjusting the relative positions of the laser 10 and the quartering photodiode 13 will now be described.

As shown in FIG. 1, the holder 6 mounting the laser 10 is tightly adhered by an adhesive agent or the like to the lens holder 3, and the holder 7 mounting the monitor photodiode 11 is similarly glued onto the holder 6. The holder 8 mounting the quartering photodiode 13 is attached to the lens holder 3 through an intermediate member 20 by a screw 21 and a washer 22. The screw 21 is loosely inserted, with a predetermined clearance, through an enlarged hole 23 formed in the upper end of the intermediate member 20, and the forward end of the screw 21 is threaded into the lens holder 3.

The holder 8 has a cylindrical body 25 mounting the quartering photodiode at one end thereof, and four terminals 26 connected to electrodes of the quartering photodiode through terminal insertion holes formed in the body and extending axially therethrough. A guide groove 28 is formed along one side of the cylindrical body. The holder 8 is slidably inserted through a hole 29 formed at the lower end of the intermediate member 20. The hole 29 is provided with a guide groove 30 cooperable with the guide groove 28. A bowed spring 31 is interposed between the two guide grooves.

The holders 6 and 7 are provided with terminals 33 and 34 connected to respective electrodes of the laser 10 and the monitor photodiode 11.

The cylindrical body 25 of the holder 8 is made of an electrically insulating material such as ceramic. Although the temperature of the laser 10 held proximate the body 25 rises to about 60° C. due to the generation of heat during its emission of light, the laser does not suffer any divergence due to thermal expansion because the ceramic material has a very small coefficient of thermal expansion. Further, the terminals 26 do not require any insulating treatment because the body 25 is not electrically conductive.

The adjustment of the relative positions of the laser 10 and the quartering photodiode 13 will now be described; the laser is fixed and the adjustment is made only by the movement of the quartering photodiode.

First, with the screw 21 loosened, the intermediate member 20 is gripped by a precision chucking device such as a robot hand and moved in the X and Y directions, carrying with it the holder 8 and the quartering photodiode 13. At the same time the laser 10 is energized to emit light. The reflected light received by the four quadrants of the photodiode 13 is measured by a suitable instrument, and the relative positions are adjusted by moving the quartering photodiode until the measured value(s) becomes a desired one, i.e. until the incident beam is centered. The positional adjustment in the X and Y directions is carried out within the range of clearance between the inner wall of the hole 23 and the screw 21. The holder 8 is loosely inserted through the enlarged hole 36 of the holder 6, so that the movement of the holder 8 is not impeded by the holder 6 when the intermediate member 20 moves in the X-Y plane.

Upon completion of the adjustment in the X and Y directions, the intermediate member 20 is tightly fixed to the lens holder 3 by the screw 21.

Next, the holder 8 is gripped by the chucking device and the relative position in the Z direction is adjusted by axially moving the holder 8, i.e. until the centered beam is spot focused.

Figure 5:
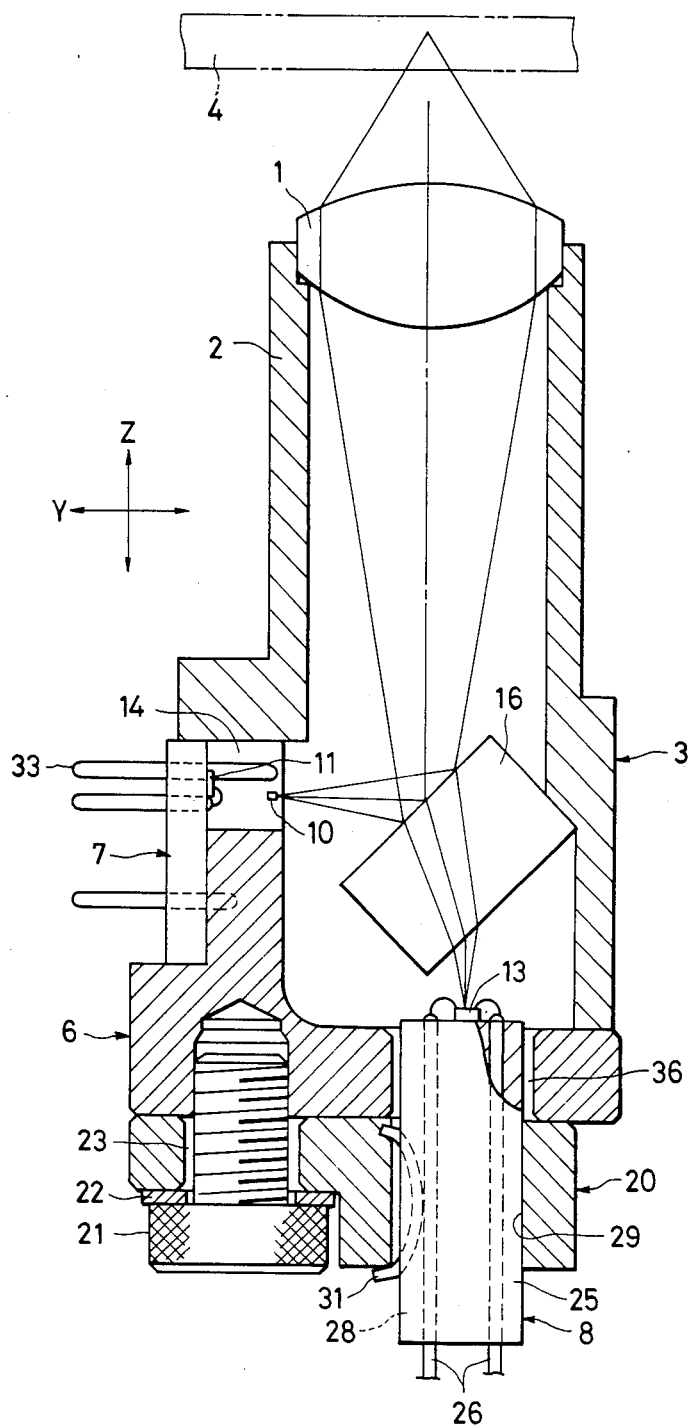
FIG. 5 is a longitudinal sectional view of another optical head assembly according to the invention.
Figure 6:
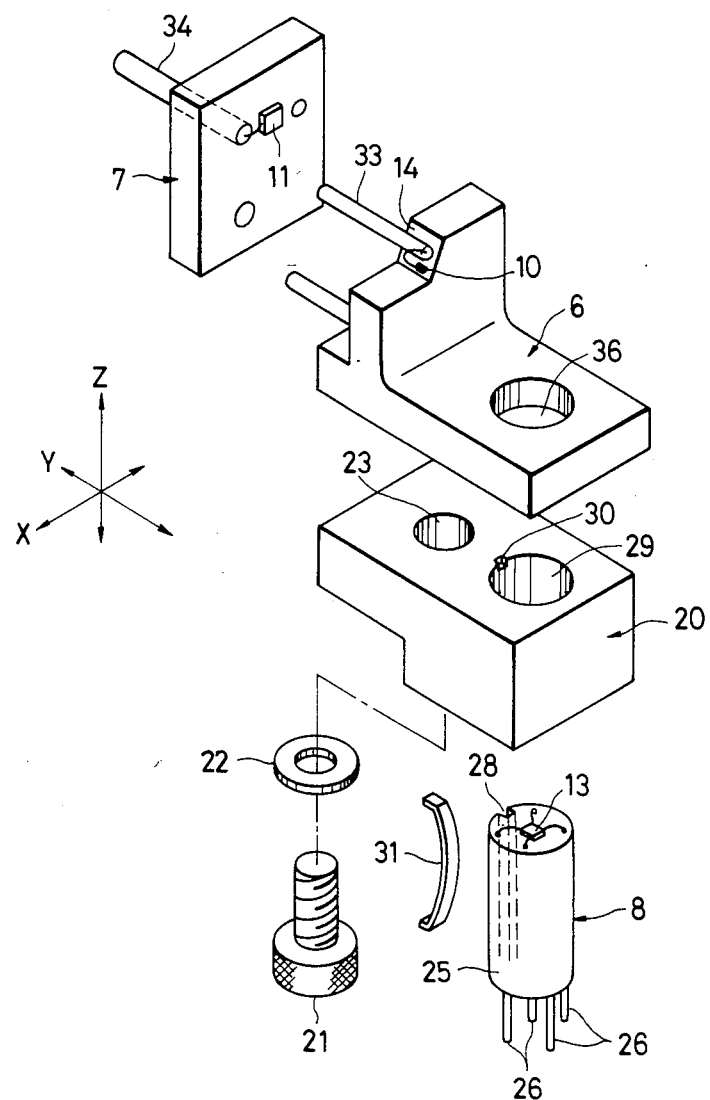
FIG. 6 is an exploded perspective view showing parts of the optical head assembly of FIG. 5.
Figure 7:
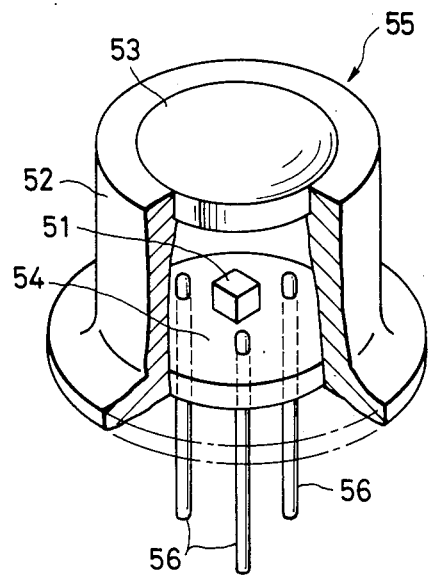
FIGS. 7, 8 and 9 are perspective views for explaining a conventional optical head assembly.
Figure 9:
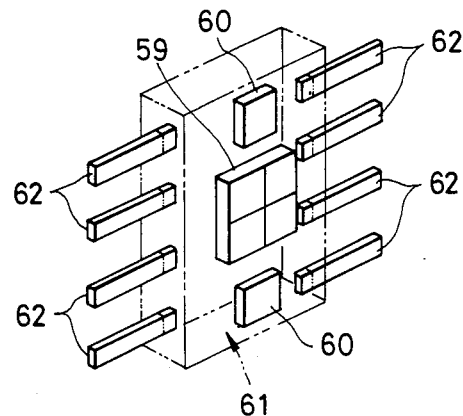
Figure 8:
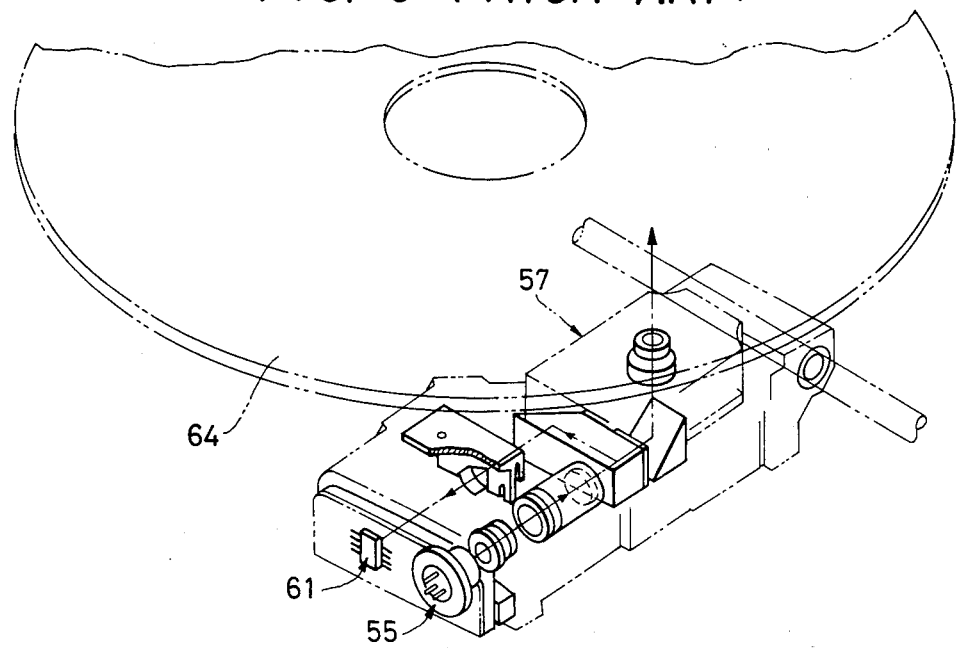

FIGS. 5 and 6 show an optical head assembly according to a second embodiment of the invention, wherein light emitted from the laser 10 and light reflected from the record surface of the disk are both passed through the rectangular prism 16. Further, the intermediate member 20 is not attached to the lens holder 3 but instead is attached to the laser holder 6 by the screw 21 so that it is movable in the X-Y plane. In the optical head assembly illustrated in FIGS. 5 and 6, parts the same as or corresponding to those in FIGS. 1 to 4 are referenced correspondingly. In this embodiment, the relative positions of the laser 10 and the quartering photodiode 13 are adjusted in the same manner as described above, and a detailed description of the positional adjustment will therefore be omitted.

Although the relative positions of the laser 10 and the quartering photodiode 13 in each of the aforementioned embodiments are adjusted by moving only the photodiode 13 relative to the fixed laser 10, the relative positions could also be adjusted by a reversed mounting arrangement wherein only the laser is moved relative to the fixed photodiode, or by moving both the laser and the photodiode.

What is claimed is:

1. An optical head assembly for recording and/or reading information on/from a surface of a disk (4), comprising:
    (a) a hollow, cylindrical first holder member (3, 6),
    (b) an intermediate member (20) adjustably mounted to the first holder member for planar movement in X and Y directions relative thereto, and having a Z axis aperture (29) extending therethrough,
    (c) a second holder member (8) extending through the aperture and guided for adjustable, axial, linear movement therein, (d) a laser (10) mounted to an inner portion of the first holder member, (e) a quadranted photodiode (13) mounted to an inner end of the second holder member, (f) a partially reflective prism (16) mounted within the first holder member for directing light emitted from the laser onto the disk surface via a focusing objective lens (1) mounted in an end of the first holder member cylinder, and for directing light reflected from the disk surface onto the photodiode, (g) means (21-23) for enabling the adjustment of the intermediate member (20), and attendantly the second holder member and photodiode mounted thereto, in the X and Y directions to a position whereat a reflected beam of laser light is centered on the photodiode, and (h) means (28, 30, 31) for enabling the axial adjustment of the second holder member in the Z axis direction to a position whereat the beam of reflected light incident on the photodiode is focused.

2. An assembly according to claim 1, wherein:

(a) the intermediate member is mounted to an external planar surface of the first holder member, and (b) the means for enabling the adjustment of the intermediate member comprises an enlarged bore (23) extending therethrough, and a screw (21) extending through the bore and threaded into the first holder member.

3. An assembly according to claim 2, wherein:

(a) the aperture extending through the intermediate member is a cylindrical bore having a first axial guide groove (30) defined therein, (b) the second holder member is cylindrical and defines a second axial guide groove (28), (c) the means for enabling the axial adjustment of the second holder member includes a spring member (31) disposed between the first and second grooves, and (d) the second holder member extends through an enlarged bore (36) in the first holder member such that the photodiode is disposed in the hollow interior thereof.

4. An assembly according to claim 3, further comprising a third holder member (7) fixedly mounted to the first holder member, and a monitor photodiode (11) mounted on an inner portion of the third holder member proximate the laser for sensing the outpu level thereof.

5. An assembly according to claim 3, wherein the second holder member is made of a ceramic, electrically insulating material, and defines a plurality of axial apertures for accommodating electrode terminals (26) of the photodiode.

6. An assembly according to claim 1, wherein the prism is rectangular, and imparts astigmatism to the reflected light beam.

* * * * *